June 16, 1942.  R. T. SANDERSON  2,286,384
APPARATUS FOR GAS ANALYSIS
Filed May 20, 1940  2 Sheets—Sheet 1

Inventor:
Robert Thomas Sanderson
By Geo. L. Parkhurst
Attorney.

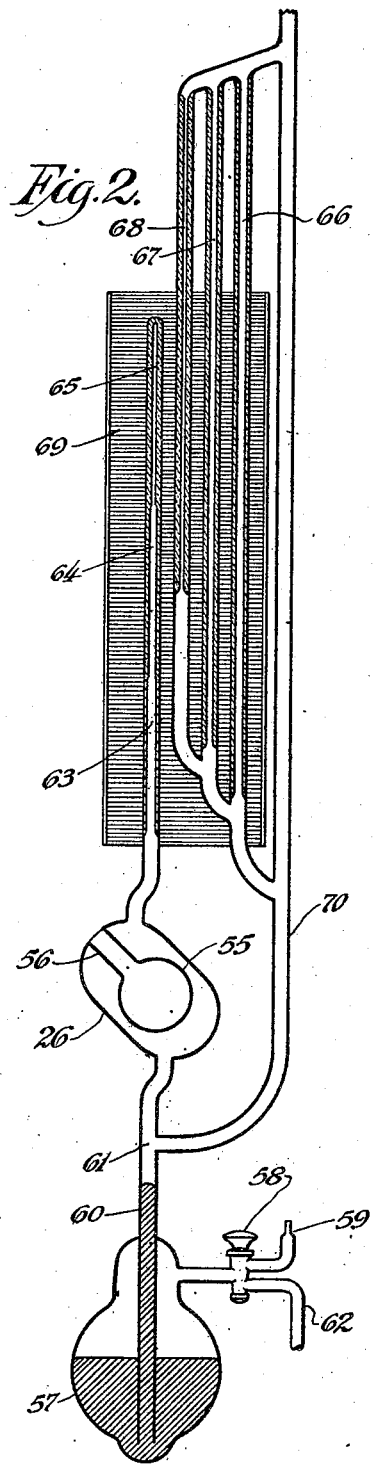
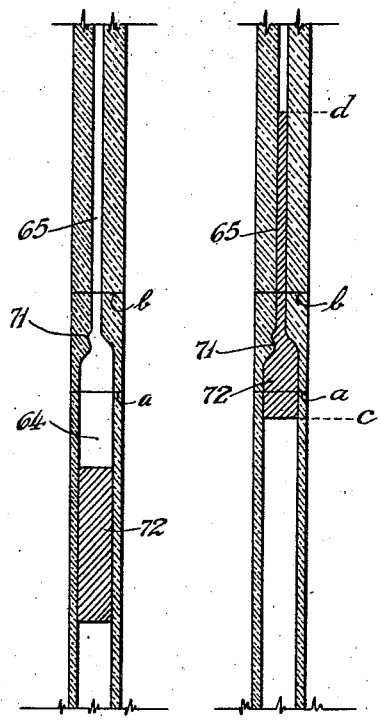
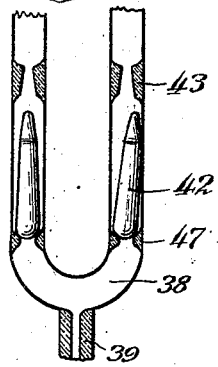

Patented June 16, 1942

2,286,384

UNITED STATES PATENT OFFICE 2,286,384

APPARATUS FOR GAS ANALYSIS

Robert Thomas Sanderson, Sierra Madre, Calif., assignor to Stanolind Oil and Gas Company, Tulsa, Okla., a corporation of Delaware Application May 20, 1940, Serial No. 336,244

9 Claims. (Cl. 73—51)

This invention relates to apparatus for gas or vapor analysis and more particularly to apparatus for determining small amounts of substances vaporizable at moderate temperatures.

In recent years the analysis of small quantities of gas and other substances which can be condensed and vaporized has become important in connection with a large variety of analytical work. One example of this is in connection with geochemical prospecting in which samples of soil gas are pumped from the soil or in which samples of the soil itself are sampled, taken to the laboratory and treated to drive off sorbed and/or entrained gases and other vaporizable constituents. In either event it is desired to measure with great accuracy small quantities of vaporizable hydrocarbons and in some instances other vaporizable substances present in such samples. Such analyses in the past have been troublesome, time-consuming and often inaccurate.

It is an object of my invention to provide simplified, highly sensitive apparatus for analyzing gases and other vaporizable substances. It is a further object of my invention to provide apparatus particularly adapted to the analysis of small amounts of hydrocarbons in connection with geochemical prospecting.

Another object of my invention is to provide apparatus of the type described which involve the least possible cost and the greatest possible convenience. A further object of my invention is to provide apparatus for analyzing gases and the like with a minimum amount of calibration of the equipment. A still further object of my invention is to provide apparatus of the type described in which portions of the apparatus can be replaced easily, quickly and economically. It is also an object of my invention to provide apparatus of the type described utilizing the whole of a given sample instead of merely a portion of it.

A still further object of my invention is to provide apparatus of the type described which can be used with a maximum of convenience. More particularly it is an object of my invention to provide apparatus applicable to samples of a large range of size.

Other and more detailed objects, advantages and uses of my invention will become apparent as the description thereof proceeds.

The invention will now be described with particular reference to a specific embodiment thereof shown in the accompanying drawings in which:

Figure 2 is a detailed elevation of the principal novel feature of my apparatus; namely, the gage which I term a Microvol;

Figure 3 is a detail of one of the valve structures shown in Figure 1; and

Figures 4 and 5 are diagrammatic showings illustrating a method of calibration useful in connection with my invention.

Figure 1:
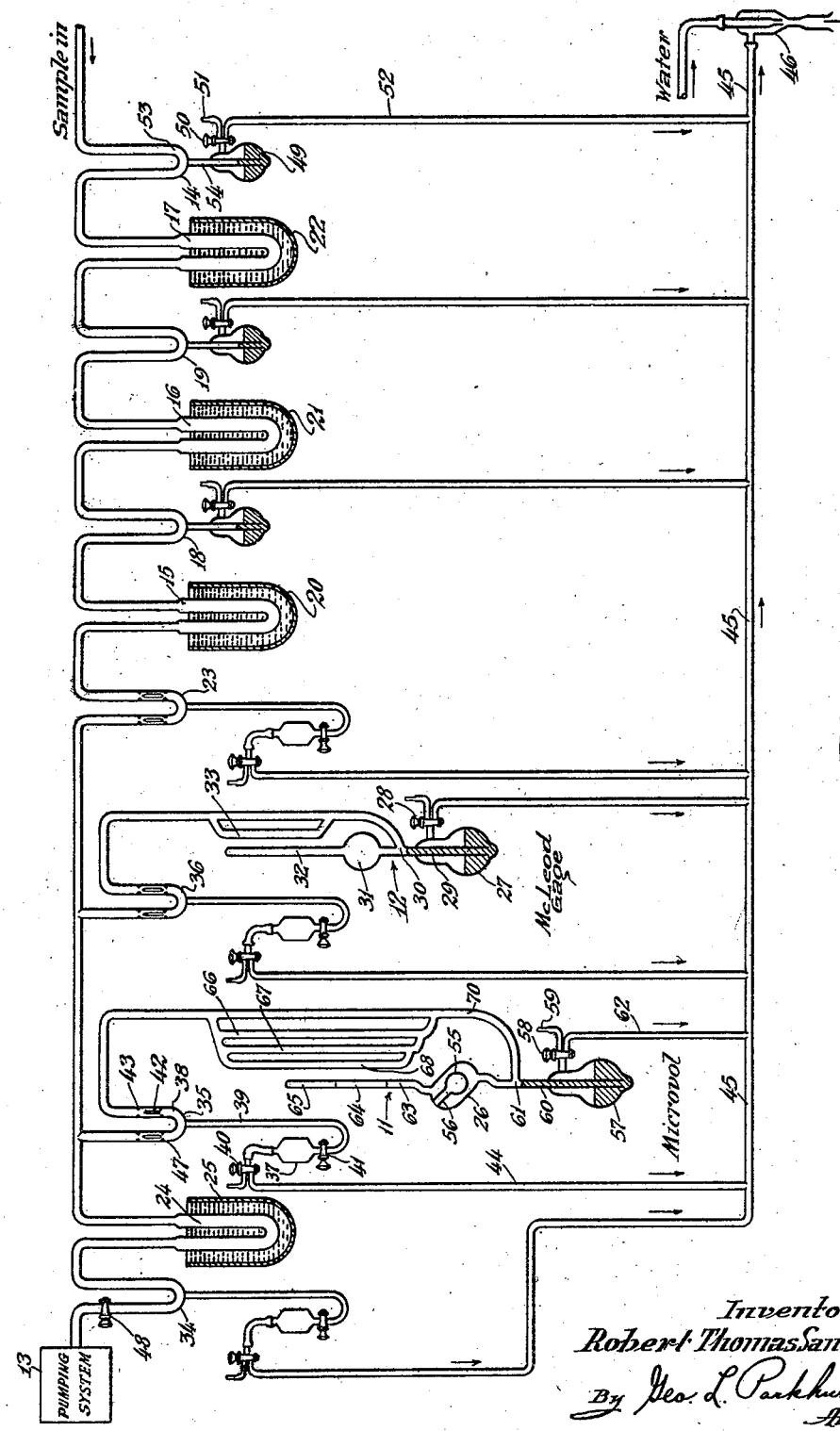
Figure 1 is a diagram illustrating in somewhat simplified form gas analysis apparatus of a type suitable for use in connection with geo-chemical prospecting as well as for other purposes.

While my invention is completely applicable to the analysis of any type of gaseous or other condensable and vaporizable substance and particularly to any type of gas analysis carried on by the use of any of the various procedures involving the so-called vacuum technique, it has been utilized by me particularly in connection with geochemical prospecting and finds especial utility in that connection. For these reasons it will be described largely as applied to geochemical work (geochemical well logging as well as surface geochemical methods) although it will be apparent to those skilled in the art that the invention is of wide and general application.

A gas sample, for instance a sample of soil gas drawn out of the soil or driven off from a soil sample, is first suitably purified. Thus, for instance, carbon dioxide and other acidic impurities can be removed by passing the gases over an alkaline purifying agent and if alkaline impurities are present they can be removed by passing the gas over an acidic purifying agent. Water is then thoroughly removed by the use of calcium chloride, activated alumina or other dehydrating agent, or preferably by trapping it out at about $-80°$ C.

Soil gas or other gas which it is desired to analyze is passed, after such purifications as is desired, into a low temperature trap held at such temperature as to condense the hydrocarbons or other substance or substances which it is desired to analyze. The sample is then transferred into the Microvol which I have invented. In this gage the quantity of this substance or substances is determined with great ease and accuracy in accordance with the above-stated objects.

Turning now to Figure 1, the apparatus shown, including the gages 11 and 12, is first evacuated by means of pumping system 13, shown diagrammatically. Valve 14, which is preferably of the mercury type as shown, is then opened and a sample of purified gas is drawn into one or more traps, for instance traps 15, 16 and 17, which can be separated by valves 18 and 19. These traps can be held at one or more low temperatures by immersing them in suitable cooling baths 20, 21 and 22. Thus, for instance, all of the hydrocarbons heavier than methane together with some of the methane can be condensed in a trap held at liquid air temperature or, better, at liquid nitrogen temperature. While simple U-shaped traps are shown, coil-shaped traps, baffled traps, traps packed with glass wool and other types of traps can be utilized.

Since pumping system 13 is operated during this condensing operation the air and other substances uncondensable at the lowest trap temperature under the prevailing pressure are drawn off. The gases can then be fractionated, if desired, by distilling them back and forth between the various traps in any desired manner, valve 23 preferably being open to permit removal of traces of substances such as methane not completely condensable at liquid nitrogen temperatures.

Thus, for instance, a hydrocarbon fraction, the amount of which is to be determined, can be segregated in trap 15 and valve 18 can be closed. In the case of geochemical prospecting the material in trap 15 can be the total vaporizable hydrocarbons, the total gaseous hydrocarbons heavier than methane or any desired hydrocarbon cut.

Having thus segregated the desired fraction, this can, after opening valve 23, be distilled into trap 24 immersed in bath 25 and located adjacent to the Microvol 11. It will be understood, of course, that in many instances all of traps 15, 16 and 17 can be omitted and the sample which it is desired to analyze can be isolated initially in trap 24. Alternatively this trap 24 can be omitted and only one or more of traps 15, 16 and 17 utilized.

During the operations thus far discussed, the pressure can be determined, if desired, at any stage by use of the familiar McLeod gage 12 although it is not essential to utilize this particular type of gage.

In brief the McLeod gage operates by venting flask 27 to the atmosphere by means of 3-way stop cock 28, thus causing the mercury level to rise in tube 29 until it reaches junction 30. As junction 30 is closed by the mercury a sample of the substances present in the system in the gaseous state is isolated in bulb 31 and superimposed capillary 32. The mercury level is then further raised to compress the isolated sample within capillary 32 and the mercury also rises within capillary 33. By noting the difference in level of the mercury in capillaries 32 and 33, which are of the same size, the pressure exerted on the sample can be determined by the use of the formula $$P_1 = \frac{V_2 P_2}{V_1 - V_2}$$

where $P_1$ is the pressure in the gage at the time the mercury passes junction 30, which is the same as the pressure in the system, $P_2$ is the pressure differential as measured by the difference in level of the mercury in capillaries 32 and 33, $V_1$ is the volume of the gage above junction 30 and $V_2$ is the volume of the compressed sample in capillary 32. These two volumes are known by calibration.

The foregoing formula follows from the fact that the pressure of the compressed sample in capillary 32 is $P_1 + P_2$, whence by the gas laws $$V_1 P_1 = V_2 (P_1 + P_2)$$

and $$P_1 = \frac{V_2 P_2}{V_1 - V_2}$$

or, since in normal use $V_2$ is negligible as compared with $V_1$ $$P_1 = \frac{V_2 P_2}{V_1}$$

While the pressure in the system can thus be measured in the system by the use of a McLeod gage with considerable ease, the determination of the amount of the total sample present in the system cannot be measured with comparable ease by means of a McLeod gage for reasons which will be discussed hereinafter.

The condensed gases or vapors which it is desired to analyze having first been segregated in a trap outside Microvol 11, for instance trap 24, valves 23 and 34 are closed, valves 35 and 36 are opened or left open and the sample is distilled into trap 26 located within Microvol 11.

As shown, valves 23, 35 and 36 are mercury valves of the type in which mercury contained in a reservoir 37 (valve 35) can be raised into U-bend 38 through capillary 39 (the system being under vacuum) by venting reservoir 37 to the atmosphere by means of 3-way stop cock 40 and opening stop cock 41. Plugs 42 (Figure 3) are thereby floated into position against upper ground seats 43 and keep the mercury from rising above them regardless of the pressure differential. These valves are opened by opening stop cock 41 and connecting reservoir 37 to a suction line, for instance by means of a 3-way stop cock 40, lines 44 and 45 and aspirator 46. The suction lowers the mercury out of U-bend 38 and plugs 42 then rest loosely on indented rests 47.

Valve 34 is similar except for the omission of plugs 42, seats 43 and rests 47 and the addition of stop cock 48. With this valve, pumping is not seriously impeded, and yet distillation away from as well as towards the pump can take place without contact with stop cock grease by raising the mercury level into the U-bend.

A third structure is shown in the case of valves 14, 18 and 19. Valve 14, for instance, includes a mercury reservoir flask 49 and a 3-way stop cock 50 which can be used to vent flask 49 to the atmosphere through capillary 51 or to apply suction to the flask via lines 52 and 45 and aspirator 46, thus causing the mercury to rise into U-bend 53 through tube 54 or to recede below the U-bend, thereby closing or opening the valve.

Distillation of the desired fraction of the sample into trap 26 within Microvol 11 can be accomplished, for example, by pouring liquid nitrogen into bulb 55 within trap 26 through neck 56 and then warming the trap originally containing the sample, for instance trap 24. This causes the sample to condense on the cold exterior surface of internal bulb 55. The completion of this operation can be determined by the use of the McLeod gage 12 which indicates when the pressure has returned to the desired very low value. In a well-evacuated system this operation commonly takes two or three minutes' time.

It will be apparent that by the procedure outlined the whole of the particular material which it is desired to measure is thus transferred to a trap within the Microvol whereas in the case of a McLeod gage the measurement is made on only a small portion of the total sample. Thus by the use of my apparatus considerably more accurate determinations can be made than when using the McLeod gage.

The use of the apparatus which I have termed a Microvol involves opening the air space in mercury reservoir 57 to the atmosphere by means of 3-way stop cock 58 and capillary 59, thus causing the mercury level to rise within tube 60. When this mercury level passes junction 61 it seals the apparatus above this junction off from the rest of the system. I then preferably continue to raise the level of the mercury until it just touches the bottom of internal bulb 55 within trap 26, causing the liquid nitrogen to evaporate and/or be blown out of the bulb.

Heat imparted by the mercury causes any residual liquid nitrogen to evaporate very rapidly. The mercury level is then lowered by means of stop cock 58 associated with aspirator 46 via lines 62 and 45 to a level just above junction 61 and the outer bulb of trap 26 can then be warmed with the hand or otherwise to bring it approximately to room temperature. The mercury level is now raised into the capillary system which is shown as made up of three superimposed capillaries 63, 64 and 65 of successively smaller size (see Figure 2).

As the mercury rises into this capillary system it likewise rises, of course, into the capillary system made up of capillaries 66, 67 and 68 which correspond in size to capillaries 63, 64 and 65 respectively. All of these capillaries are mounted against a suitable scale 69 (Figure 2), for instance a piece of millimeter graph paper. It is thus easy to determine the difference in level between the top of the mercury in one of the capillaries 63, 64 and 65 and the top of the mercury in the corresponding capillary 66, 67 or 68. Since the vacuum applied to the system is such that the pressure within the system exterior to the Microvol is negligible as compared with the pressure of the sample within the Microvol, the difference in level between the two columns of mercury is a direct measure of the pressure to which the sample is subjected. Capillaries 63, 64 and 65 being calibrated, as will hereinafter be described, the volume of the sample is known and from its volume and pressure the volume at standard temperature and pressure can readily be calculated by the use of the familiar formulae $$V_1 P_1 = V_2 P_2$$

and $$V_2 = \frac{V_1 P_1}{P_2}$$

assuming that the composition of the sample is known its weight can likewise be calculated with ease.

As contrasted, for instance, with the McLeod gage, neither the gage nor the system as a whole, need be calibrated since all that is significant is the volume of the capillaries per unit of length. As has been pointed out, in the case of a McLeod gage not only must the capillaries be calibrated but the volume of the gage as a whole above junction 30 must be known with accuracy. Moreover, if a McLeod gage is to be used not merely to determine the pressure in the system but also for analytical purposes, i. e. to determine the total amount of a particular substance or substances, the volume of the whole system in which the sample is disposed must be known. This is for the reason that the sample taken within a McLeod gage such as gage 12 is only that fraction of the total sample represented by the fraction $$\frac{V_1}{V_3}$$

where $V_1$ is the volume of the McLeod gage above junction 30 and $V_3$ is the volume of the system as a whole.

Thus when a system using a McLeod gage for analysis, as contrasted with mere pressure measurement, is modified or when it is damaged and parts must be replaced, recalibration is necessary. With my Microvol, on the other hand, all that is required is calibrated capillaries which can readily be replaced. Calibrated spare capillary tubes can be kept in stock for emergencies. If the top capillary 65 is damaged only a few minutes is required for replacement, compared to several hours breakdown period with a McLeod gage system.

These capillaries are selected for uniformity as determined by measuring the length of a thread of mercury at various positions in the capillary. The volume per millimeter or other unit of length for each size of capillary can be determined by weighing mercury threads of carefully measured length.

Capillaries 63 and 66 can suitably be of 0.000425 cc./mm. size while capillaries 64 and 67 can be 0.00295 cc./mm. and capillaries 65 and 68 can be 0.0060 cc./mm. Instead of three pairs of capillaries a single pair of capillaries or two or any greater number of pairs can be used although the use of three pairs is particularly convenient. If more than one pair of capillaries is used they should, of course, decrease in size from bottom to top.

In the form of instrument which I have constructed capillaries 63, 64 and 65 are 9 cm., 10 cm. and 11 cm. long respectively. The length of capillary 66 is 45 cm. Tubes 60 and 70 are made of 10 mm. glass tubing. Mercury reservoir 57 should be large enough to contain more than enough mercury to fill the gage and can suitably be a 250 cc. bulb.

Inner bulb 55 can suitably be 30 mm. in diameter and should be at least 20 mm. in diameter. The opening 56 at the mouth of this bulb can suitably be 8 to 10 mm. in diameter. The outer bulb of trap 26 need be only large enough to contain the inner bulb 55. By sealing the mouth 56 of the inner bulb flush with the surface of the outer bulb, the danger of breakage resulting from thermal shocks is minimized.

The various dimensions given can, of course, be considerably modified as desired. However, the top of capillary 65 should not be more than 70 cm. above the top of the mercury in reservoir 57 since atmospheric pressure must be relied upon to push the mercury up into the capillary. The entire instrument can suitably be made of Pyrex glass.

A Microvol having the preferred dimensions above given can be used to measure accurately samples ranging from 0.42 cc. to 0.000056 cc. at standard temperature and pressure; a range of 7,500 to 1. This is a great advantage in many types of analyses, particularly in connection with geochemical prospecting since when the sample is originally taken the hydrocarbon content is unknown. If one of the prior art techniques is used the sample may contain too little of the desired components to make accurate analysis possible or may contain more of them than the apparatus can handle. In either event a new sample must be taken with consequent loss of time and increase of expense. Due to the large range of sample sizes which my Microvol can handle this difficulty is not encountered in the practice of my invention.

Another advantage of the Microvol which has previously been discussed is that it measures the entire sample of the desired component or components and not merely a part of it. This greatly increases the sensitivity of the instrument. An important corollary advantage is that difficulties due to the sorption of a portion of the component or components to be measured on the walls of the apparatus can readily be avoided. When using a McLeod gage or the like such sorption sometimes reaches very serious proportions with the result that the ratio of the amount of material in the gage to the total amount in the system cannot be determined with reasonable accuracy. With the Microvol, on the other hand, the walls of the system outside the Microvol can be warmed to drive sorbed materials into the Microvol while condensing them within the Microvol. This warming operation does not affect the accuracy of the analysis since the entire sample is taken within the gage and temperature differences therefore do not affect the analysis.

In the use of a McLeod gage calibration involves careful adjustment of the mercury level to the top of the capillary. This is not necessary with the Microvol and the instrument can be checked readily by the simple device of observing the pressure-volume relationships at various volumes.

I have described above the calibration of the individual capillaries. After joining capillaries 63, 64 and 65 together but before sealing them to trap 26 it is highly desirable to calibrate the joints between these various capillaries.

This can be done as illustrated in enlarged Figures 4 and 5 which show the joint 71 between capillaries 64 and 65. The joint between capillaries 63 and 64 is similarly handled. Capillaries 64 and 65 as shown are of previously determined bore. After joining them permanent marks $a$ and $b$ are made, one at each side of the joint 71. Mercury 72 is then placed in one capillary (Figure 3) and its length is carefully measured, the average of several readings being taken. Thus the volume of the mercury is determined from the known bore of the capillary.

The mercury is then moved to the position shown in Figure 4, the distances $c$—$a$ and $b$—$d$ are carefully measured and the corresponding volumes are calculated. The sum of these volumes is subtracted from the previously-determined total mercury volume to give the volume of the joint space $a$—$b$.

This measurement is repeated several times, using different amounts of mercury, and the average is taken as the true joint volume.

Knowledge of the joint volumes along with knowledge of the volumes of the capillaries per unit of length permit ready calculation of the volume of any sample compressed in the capillaries of the Microvol.

My invention is particularly applicable to the analysis of normally gaseous materials by the use of vacuum technique. Such gaseous materials include carbon dioxide, sulfur dioxide, ethane, propane, butane, ethylene, propylene, butylenes, acetylene and many other gases and mixtures. In fact any substance or mixture of substances boiling below room temperature can be analyzed as described, although my invention is particularly applicable to substances volatile at about $-80°$ C. The various components can be fractionated and they can then be individually measured in the Microvol or any mixture of them can be measured.

The invention is also applicable to substances boiling somewhat above room temperature, particularly substances which are relatively readily volatilizable. Moreover, it is perfectly possible to jacket the whole or any part of the Microvol and make the measurement at elevated temperatures so that no particular limitation is placed upon the type of substances which can be measured except, of course, that it must be possible to collect them within the Microvol by condensation or otherwise and then vaporize them.

While I have described my invention in connection with certain specific embodiments and applications thereof, it will be understood that these are by way of illustration and I do not mean to be restricted thereto but only to the scope of the appended claims in which I define the novelty inherent in my invention.

I claim:

1. A Microvol for the analysis of gaseous and vaporizable substances comprising a trap for collecting a sample of at least one such substance, means for cooling said trap to condense said substance within said trap, a liquid reservoir in communication with said trap, a measuring tube closed at its upper end and communicating through its lower end with said trap, a second measuring tube communicating with said liquid reservoir, and means for forcing liquid from said reservoir directly into said second measuring tube and also through said trap and then into the first-mentioned measuring tube.

2. A Microvol according to claim 1 in which said two tubes are juxtaposed and provided with a scale common to said two tubes.

3. A Microvol according to claim 1 in which said means for cooling said trap comprises internal means for receiving a cooling agent.

4. A Microvol for the analysis of gaseous and vaporizable substances comprising a trap constructed and arranged to condense at least one such substance within said Microvol, a liquid reservoir, a conduit connecting said trap with said reservoir, a first capillary closed at its upper end and connected through its lower end with said trap, a second capillary communicating with apparatus external to said Microvol and also communicating with said conduit, and means for transferring liquid from said reservoir directly into said second capillary and also through said trap and thence into said first capillary.

5. A Microvol according to claim 4 in which said two capillaries are of the same size.

6. A Microvol for the analysis of gaseous and vaporizable substances comprising a trap, means for cooling said trap to condense at least one such substance, a mercury reservoir, a conduit connecting said trap with said reservoir, a first capillary closed at its upper end and connected through its lower end with said trap, a second capillary communicating with apparatus external to said Microvol and also communicating with said conduit, and means for transferring mercury from said reservoir directly into said second capillary and also through said trap and thence into said first capillary.

7. A Microvol for the analysis of gaseous and vaporizable substances comprising a trap constructed and arranged to condense at least one such substance, a liquid reservoir, a conduit connecting the bottom of said trap with said reservoir, a first calibrated capillary closed at its upper end and connected through its lower end with the top of said trap, a second graduated capillary communicating with apparatus external to said Microvol and also communicating with said conduit, and means for transferring liquid from said reservoir directly into said second capillary and also through said trap and thence into said first capillary.

8. Apparatus for the analysis of gaseous and vaporizable substances comprising a trap, means disposed within said trap adapted to condense at least one such substance within said trap, a mercury reservoir, a conduit connecting the bottom of said trap with said reservoir, a first calibrated capillary closed at its upper end and connected through its lower end with the top of said trap, a second graduated capillary communicating with said conduit, means communicating with the upper part of said second capillary for evacuating all of the apparatus previously mentioned, and means for transferring mercury from said reservoir directly into said second capillary and also through said trap and thence into said first capillary.

9. Apparatus for the analysis of gaseous and vaporizable substances comprising a trap adapted to condense at least one such substance, a liquid reservoir, a conduit connecting said trap with said reservoir, a system of superimposed capillaries, said capillaries being of varied bore with the largest capillary on the bottom and the smallest capillary on the top, said capillary system being closed at its upper end and connected through its lower end with said trap, a second system of capillaries of bores matching the bores of said first-mentioned system of capillaries, said two systems of capillaries being disposed in operative relationship to each other, means for evacuating said apparatus, said second system of capillaries being disposed in communication with said means for evacuating said apparatus, means for transferring liquid from said reservoir through said trap into said first-mentioned system of capillaries and, without passing through said trap, into said second system of capillaries, and means for determining the differential height of the liquid level in corresponding capillaries of said two systems of capillaries.

R. THOMAS SANDERSON.